US012801592B2

(12) United States Patent
Wang et al.

(10) Patent No.: US 12,801,592 B2
(45) Date of Patent: Nov. 17, 2026

(54) UNIFIED DATA MANAGEMENT METHOD AND SYSTEM FOR INDUSTRIAL AUTOMATION

(71) Applicant: Siemens Aktiengesellschaft, Munich (DE)

(72) Inventors: Lingyun Wang, Princeton, NJ (US); Stefan Nitzsche, Frankenthal (DE); Stefan Werner, Altdorf bei Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 19/099,978

(22) PCT Filed: May 30, 2023

(86) PCT No.: PCT/US2023/023802

§ 371 (c)(1),
(2) Date: Jan. 30, 2025

(87) PCT Pub. No.: WO2024/039427

PCT Pub. Date: Feb. 22, 2024

(65) Prior Publication Data

US 2026/0030239 A1 Jan. 29, 2026

Related U.S. Application Data

(60) Provisional application No. 63/371,422, filed on Aug. 15, 2022.

(51) Int. Cl.
*G06F 16/00* (2019.01)
*G06F 9/54* (2006.01)
(Continued)

(52) U.S. Cl.
CPC ............ *G06F 16/242* (2019.01); *G06F 9/544* (2013.01); *G06F 16/2455* (2019.01)

(58) Field of Classification Search
CPC .... G06F 16/242; G06F 9/544; G06F 16/2455; G06F 16/24524; G06F 16/256
See application file for complete search history.

(56) References Cited

U.S. PATENT DOCUMENTS

2016/0328432 A1* 11/2016 Raghunathan ...... G06F 16/2264
2019/0196890 A1* 6/2019 Bucchi .................. G06F 16/951
(Continued)

OTHER PUBLICATIONS

Prasad Srikrishna et al:; "Application of polyglot persistence to enhance performance of the energy data management systems",; 2014 International Conference on Advances in Et,f.ctronics Computers and Communications, IEEE,; Oct. 10, 2014 (Oct. 10, 2014), pp. 1-6; XP032717986; DOI: 10.1109/ICAECC.2014.7002444; [retrieved on Jan. 6, 2015] the whole document.
(Continued)

*Primary Examiner* — Paul Kim

(57) ABSTRACT

In a unified data management system for industrial automation, a query request is received via a unified query API layer configured to expose a common interface for accessing data from a persistent storage layer including multiple data stores that ingest data respectively from multiple data sources in an automation system. The data stores include different access APIs and data schema. Query parameters are extracted from the unified query API layer to build a dedicated query structured for a specific data store by a query builder utilizing a semantic layer. The semantic layer can map queries to individual data stores based on context information derived from query parameters and provide access to individual data stores based on their respective access API and data schema. The dedicated query is executed directly
(Continued)

on the specific data store by a query engine and a query result is returned via the unified query API layer.

14 Claims, 5 Drawing Sheets

(51) Int. Cl.
*G06F 16/242* (2019.01)
*G06F 16/2455* (2019.01)

(56) References Cited

U.S. PATENT DOCUMENTS

| | | | | |
|---|---|---|---|---|
| 2019/0361916 | A1* | 11/2019 | Weaver | G06F 16/00 |
| 2024/0231333 | A9* | 7/2024 | Nixon | G05B 19/4185 |
| 2025/0245219 | A1* | 7/2025 | Arora | G06F 16/2452 |
| 2025/0252135 | A1* | 8/2025 | Bourbie | G06F 40/205 |

OTHER PUBLICATIONS

Josifovski V et al: "Garlic: A New Flavor of Federated Query Processing for DB2"; Proceedings of the ACM SIGMOD International Conference on Management ofdata: Jun. 3-6, 2002, Madison, Association for Computing Machinery, New York, NY, US,; Jun. 4, 2002 (Jun. 4, 2002);pp. 524-532; XP002390477; DOI: 10.1145/564691.564751; ISBN: 978-1-58113-497-1.

* cited by examiner

UNIFIED DATA MANAGEMENT METHOD AND SYSTEM FOR INDUSTRIAL AUTOMATION

TECHNICAL FIELD

The present disclosure generally relates to industrial automation systems, and in particular, to methods, systems and computer program products for unified data management of data generated in an automation system.

BACKGROUND

In present day industrial automation, such as in manufacturing, more and more data is being generated on the field. For example, a typical factory can generate about 1 TB data per day. The trend is expected to continue with a growing number of so-called "Internet of Things" or IoT devices, such as industrial cameras, wearables, virtual reality/augmented reality devices, etc., which can participate in the automation process. In many industries, regulation, safety, and quality control may demand persistent storage of all important data. The data may need to be accessed by applications for performing data analytics or other tasks.

As more and more data of various types are ingested into the automation process, accessing and utilizing non-uniform data from different data stores (or databases) can become increasingly cumbersome and time consuming. Each data store can have its own schema, access API, communication/messaging protocols, etc. Accessing data from different data stores may involve detailed understanding of each these properties for the different data stores, which can increase the application development cycle and result in heavy, monolithic applications that are hard to develop and maintain, especially as more and more data of various types are ingested into the automation process.

SUMMARY

Briefly, aspects of the present disclosure provide a unified data management system and method for industrial automation that can address the above-mentioned technical problem, namely non-uniform data access for a vast and increasing number of data sources in an automation system with different data types and different format and schema of the raw data.

According to a first aspect, a data processing system for an automation system is provided. The data processing system comprises one or more processors and non-transitory memory storing a software stack comprising computational modules executable by the one or more processors. The software stack includes a unified data management module. The unified data management module is configured to receive a query request via a unified query API layer. The unified query API layer is configured to expose a common interface for accessing data from a persistent storage layer including a plurality of data stores that ingest data respectively from a plurality of data sources in the automation system, wherein the plurality of data stores include different access APIs and data schema. The unified data management module is configured to extract query parameters from the unified query API layer and use the extracted query parameters to build a dedicated query structured for a specific data store by a query builder utilizing a semantic layer. The semantic layer is configured to map queries to individual data stores based on context information derived from query parameters and provide access to individual data stores based on their respective access API and data schema. The unified data management module is configured to execute the dedicated query directly on the specific data store by a query engine and return a query result via the unified query API layer.

Further aspects of the disclosure are directed to a corresponding computer-implemented method and to a computer program product including instructions executable by a data processing system to perform the above-described method.

Yet another aspect of the disclosure is directed to an automation system. The automation system comprises a controller for controlling a physical device. The controller includes a computing device having an open real-time platform that comprises: an inter-app communication layer providing one or more APIs usable by multiple processes running on the controller for standardized communication between the processes, and a real-time execution service providing one or more APIs usable by the multiple processes to coordinate execution of control loops based on a real-time requirement. The automation system further comprises an engineering system. The engineering system comprises one or more processors, and a non-transitory memory storing instructions executable by the one or more processors to generate a control app by a method as described above, for deployment on the controller. The deployed control app is thereby configured to utilize the APIs provided by the inter-app communication layer and the real-time execution service to execute control loops on the controller.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
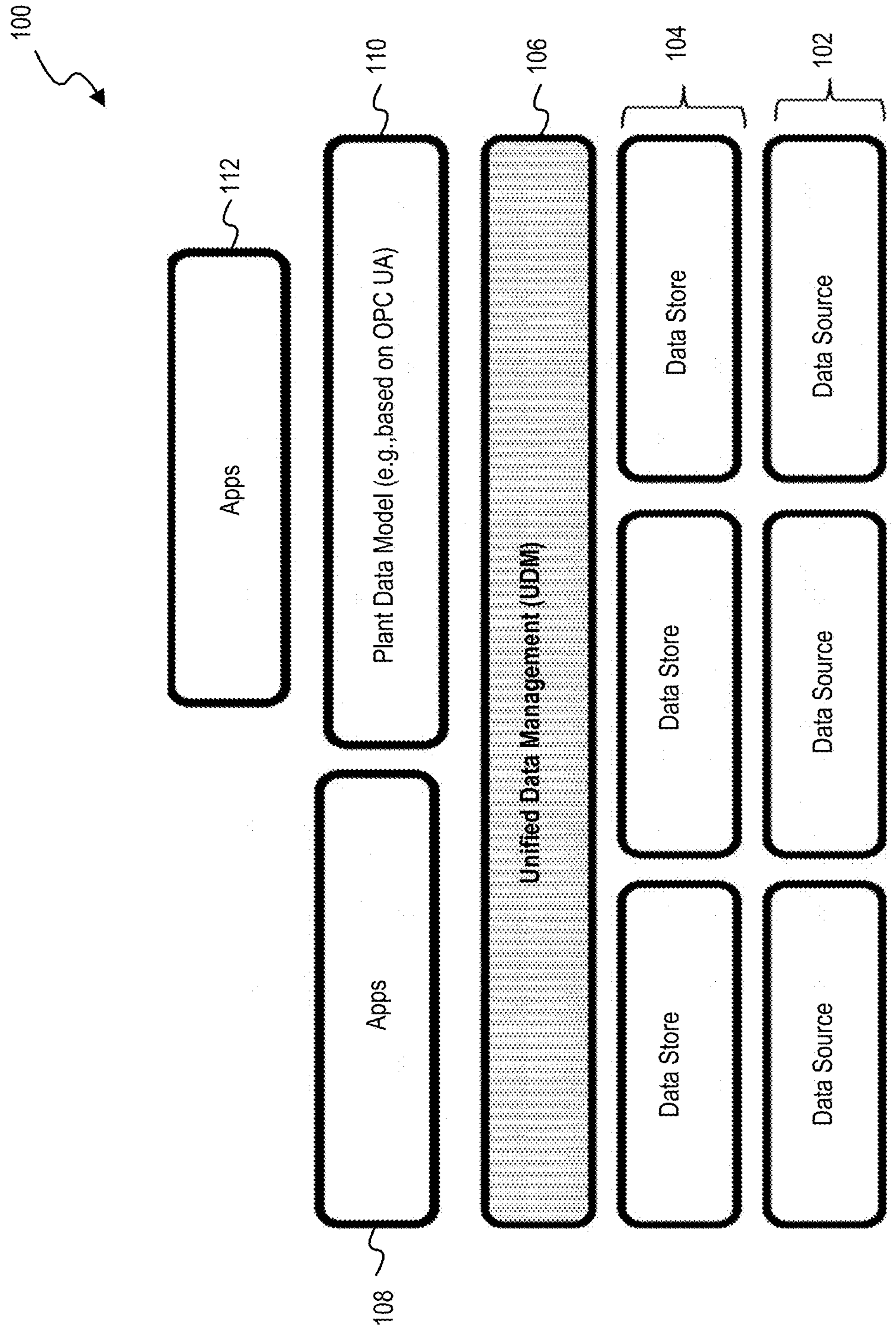
FIG. 1 is a high-level block diagram of a system for unified data management in an automation system according to aspects of the present disclosure.

Embodiments of the disclosed methodology are directed to a data management solution for an automation system that can provide unified access to data from a large number of different data sources (including various field devices, controllers, etc.) that produce data of different data types with different data properties. A particularly suitable application of the disclosed methodology is in a process historian in an automation system. A process historian (or data historian) is a software and hardware solution for data management in the industrial automation domain, which can archive historical process data (e.g., digital and analog inputs and outputs) from automation field devices and controllers and provide interfaces for applications (apps) to access and retrieve the data.

To provide persistence of data in an automation process, data from different data sources are ingested into specialized data stores on permanent storage media. For instance, a process value like temperature may be stored in a time series database, plant asset information may be stored in a relational database, images from an inspection camera may be stored in a file server, and so on. Each data store can have its own data schema, access API (short for Application Programming Interface), communication/messaging protocols, etc.

In many automation systems, the logic to access data from different data stores is typically provided inside an app. The app thereby manages the data schema, access API, communication/messaging protocols, etc. of each data store. However, any change, such as an addition of a new data source or a change in database schema, can potentially require a change in the app. This can result in a heavy, monolithic app that is hard to develop and maintain, especially as more and more data of various types are ingested into the automation process.

In some automation systems, apps do not access data from data stores directly but through a plant data model. A plant data model may be built using a standard such as Open Platform Communications Unified Architecture (OPC UA), which is built between the data and the app. A plant data model based on OPC UA can provide a semantically enriched and graph-based data structure, which can be queried by apps to access automation data (including live data, historical data and contextual data). An example of such a plant model is described in the European Patent Application No. 22182015.2, filed by the present Applicant, which is incorporated by reference herein in its entirety. In this scenario, the app is based on the standard (e.g., OPC UA) that the plant data model supports. The plant data model typically contains data service components (e.g., specific connector for each data source) which are required to import data from the data stores into the model, wherein the data imported into the model is accessible by the app.

Embodiments of the disclosed methodology can offer an improvement to either of the above-mentioned known approaches.

FIG. 1 shows a high-level view of a system 100 for data management in an automation system according to a disclosed embodiment. The automation system includes a number of data sources 102, which may include controllers (e.g., programmable logic controllers or PLCs), field devices (e.g., sensors, actuators), servers, and other IoT devices. Data from each data source 102 is ingested into a respective data store 104 on permanent storage media, which may, at least in some cases, be local to the data source 102. The data stores 104 expose different access APIs and data schema as described above. The disclosed methodology is based on abstracting the data management functionality, such as management of the different data store access API, data schema, etc., into one module, referred to herein as a unified data management module (or UDM module or simply UDM) 106. The UDM 106 provides a unified query interface for modularized applications or apps 108 to access data directly from the data stores 104. The provision of the UDM 106 allows apps 108 to be developed that are open and agnostic to the data properties of the data stores 104 which are essentially "hidden" from these apps.

The UDM 106 can obviate the requirement for a plant data model. However, as shown in FIG. 1, the UDM 106 can also be integrated with existing automation products that provide data access to apps 112 via a plant data model 110 such as that described above. In this case, UDM 106 may be provided as a layer below the plant data model 110, as shown. Since the data management functions, such as management of the different data store access API, data schema, etc., are abstracted into the UDM 106, the plant data model 110 may be simplified without requiring the above-mentioned data service components. The existing apps 112 that were developed to access data via the plant data model 110 (e.g., based on OPC UA standard) can still be used without modification.

Figure 2:
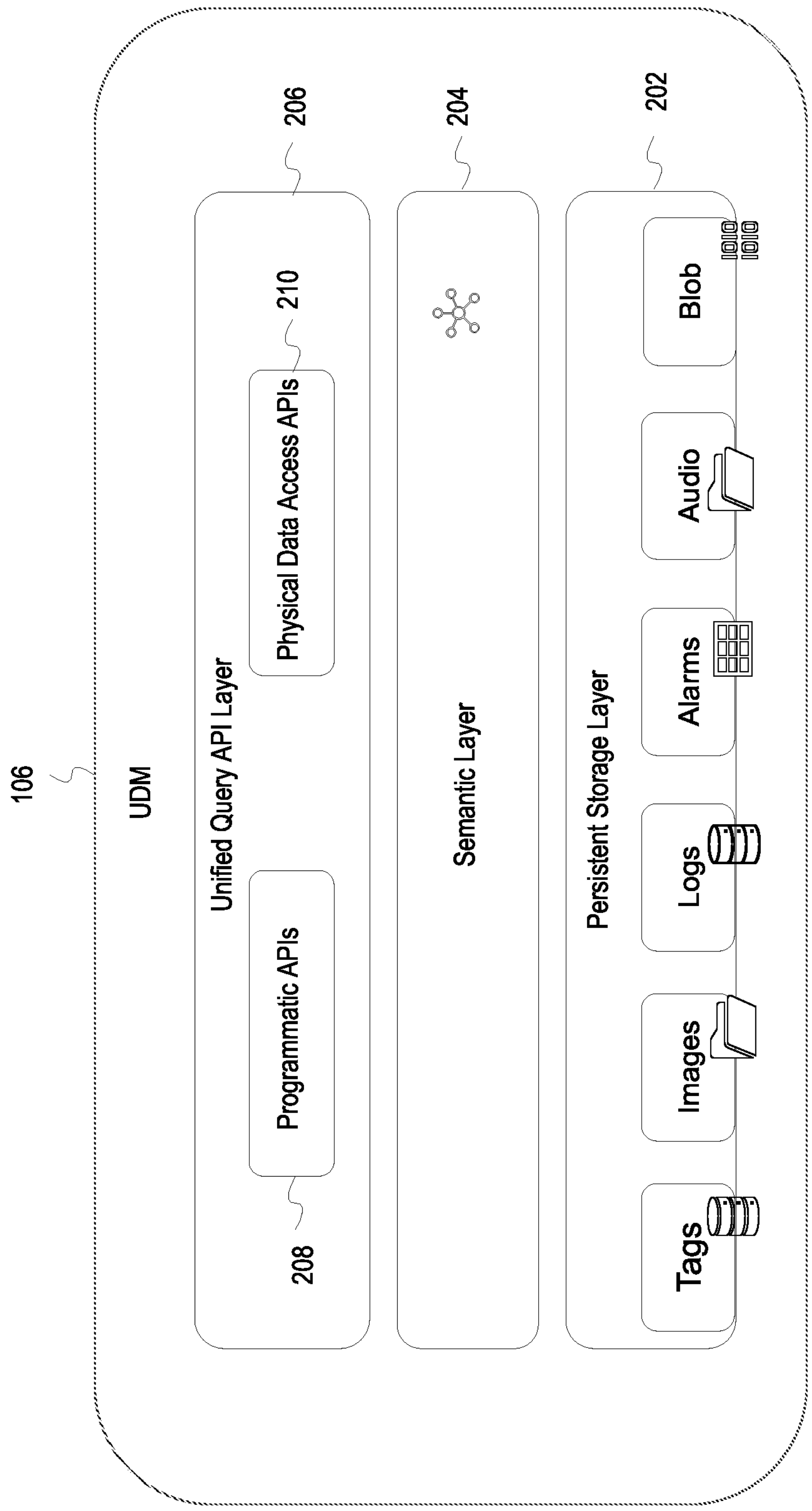
FIG. 2 is a block diagram illustrating components of a unified data management module (UDM).

According to a disclosed embodiment, as shown in FIG. 2, the UDM 106 is realized via the following layers, namely, a persistent storage layer 202, a semantic layer 204 and a unified query API layer 206. Example implementations of these layers are described below.

The persistent storage layer 202 forms the lowest layer of the UDM 106 that includes the plurality of data stores. The data stores may be specialized for the properties of the data produced by the various data sources. For example, images from a camera may be stored in a file system, audio or vibration from acoustic sensors may be stored in an audio file system or a time series data base, alarms may be stored in a table or relational database, media content may be stored in a BLOB database, and so on. The persistent storage layer 202 thus utilizes data stores that ingest raw data from the data sources. This ensures that the original data is retained without any duplication or import/export of data (e.g., in contrast to a cloud-based data lake implementation). At least some of the data stores in the persistent storage layer 202 can therefore be on permanent storage media local to the data sources.

If a data source does not have local permanent storage, the UDM 106 can provide one or more pre-built data stores as part of the persistent storage layer 202 for ingesting raw data directly from the data source. Such a pre-built data store may be optimized for the data properties associated with the data source. In this case, the UDM 106 may provide an additional ingestion API layer (not shown) between the persistent storage layer 202 and the data source. The ingestion API layer may include a suite of one or more connector APIs, such as OPC UA, OLE DB, Structured Text, XML DA, MQTT Unstructured Data, Modbus, etc. In embodiments, the ingestion API layer may be configurable based on the scale of implementation of the UDM 106.

The semantic layer 204 provides a mechanism for the unified query AP layer 206 to query data from the persistent storage layer 202. The semantic layer 204 manages the context of the data from different data sources and data stores. The semantic layer 204 is utilized to map queries from a query request received via the unified query API layer 206 to specific data stores based on the context information. The context information may include, for example a data type and/or a data store identifier extracted from query parameters of the query request. The semantic layer 204 is also utilized to access individual data stores in the persistent storage layer 202 based on their respective access API and data schema.

In one embodiment, the semantic layer 204 may include a service registry for each data store containing an address, data type, assess API and data schema. The data store address may be defined based on the type of connection available between the semantic layer 204 and the individual data stores (e.g., an IP address in case of a TCP/IP connection). In some cases, the service registry may contain a specific data store ID or key for each data store, where multiple data stores are mapped to single address (e.g., same physical storage hardware). In some embodiments, the semantic layer 204 may dynamically detect a status (online/offline) of the data stores, for example via a publisher-subscriber based communication. Thereby, newly added data stores may be intelligently detected by the semantic layer 204. Based on the information published by the data stores, the lineage of newly added data stores with data sources can also be automatically established.

The semantic layer 204 may be coupled to or be part of an overall specialized data management layer of the UDM 106, that includes a suite of other components such as data cleaning, data transformation, data compression, data indexing, database management system (e.g., relational DB, graph DB, time series DB), and so on. In embodiments, the overall specialized data management layer may be configurable based on the scale of implementation of the UDM 106.

The unified query API layer 206 exposes a common interface for accessing data from the different data stores in the persistent storage layer 202. The unified query API layer 206 receives a query request (e.g., from an application, a plant data model, or a user) including query parameters structured in a simple unified syntax. A query builder extracts the query parameters from the unified query API layer 206 and utilizes the semantic layer 204 to build a dedicated query for a specific data store, based on the extracted query parameters that include context information for mapping the query to the specific data store. Since the data stores can have different addresses, support different schema and expose different access APIs, the dedicated query built utilizing the semantic layer 204 is structured specifically for the individual data store and can be very different from the query request structured in the unified syntax. The semantic layer 204 can thus be used to transform or convert a query request in a simple unified format to a dedicated query structured in a specialized format that can be routed to a specific data store, which may be local to a data source. The dedicated query is then executed directly on the specific data store by a query engine and a query result is returned via the unified query API layer in a simple, unified format understandable to the application, plant data model or user.

For certain types of query requests, based on the context information derived from the query parameters, the semantic layer 204 may be utilized by the query builder to build multiple dedicated queries from the query request, each dedicated query structured respectively for a specific data store. The multiple dedicated queries may be executed directly on the specific data stores by the query engine and data aggregated therefrom returned in the form of a consolidated query result via the unified query API layer 206.

As shown in FIG. 2, the unified query API layer 206 may include a suite of programmatic APIs 208 for providing programmatic access to data from the persistent storage layer 202 by an application or a plant data model of the automation system. Non-limiting examples of applications that may access data using the UDM 106 directly or via the plant data model may include apps for performance monitoring/diagnostics, data analytics, digital twins, among others. The programmatic APIs can include interfaces based on one or more of: REST API, Graph QL, SQL, OData, among others. Alternately or additionally, the unified query API layer 206 may include one or more physical data access APIs 210 for providing physical data access from the persistent storage layer 202 by a user for retrieving data therefrom. The UDM 106 can thus provide a unified interface for a user to retrieve raw data (e.g., by copying data out to a flash drive) that is locally stored at the data sources without having to physically visit the plant. For example, the physical data access API 210 may be suitably implemented using a command line interface (CLI). In embodiments, the unified query API layer 206 may be configurable based on the scale of implementation of the UDM 106.

Figure 3:
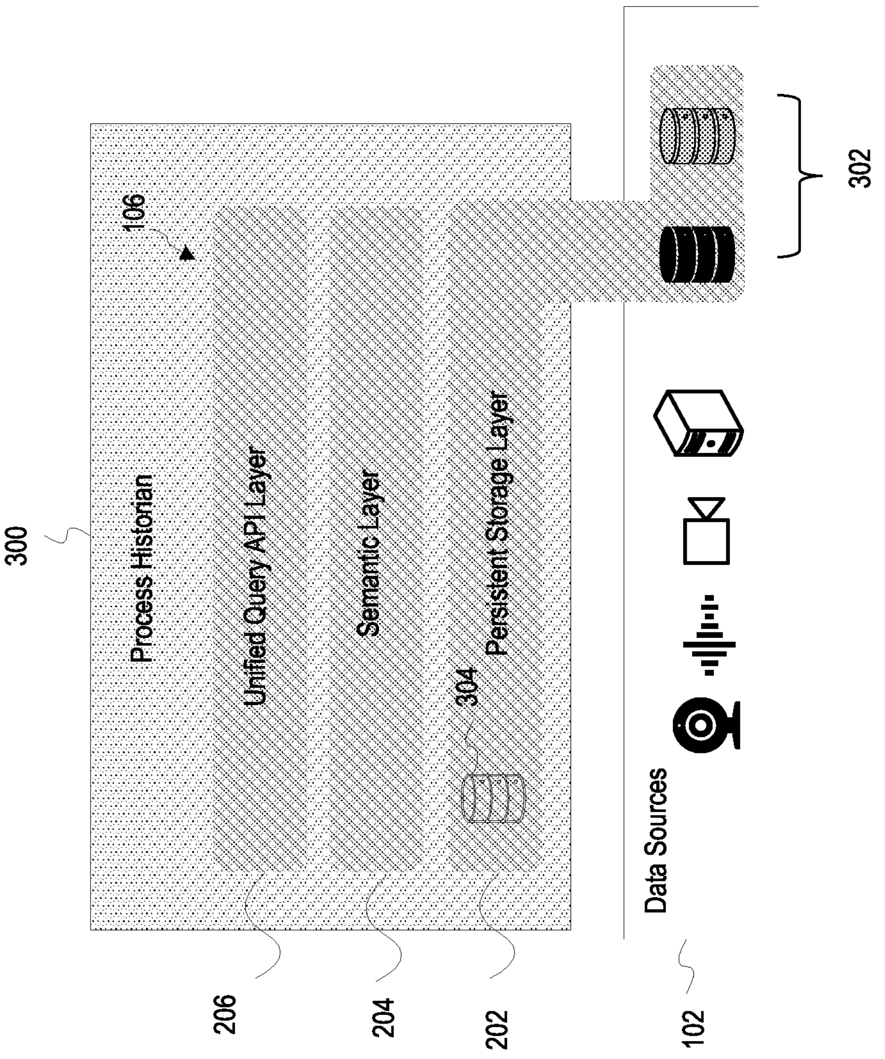
FIG. 3 illustrates an example of process historian of an automation system including a UDM according to disclosed embodiments.

FIG. 3 illustrates an example of a process historian software 300 that includes a UDM 106 according to one or more of the disclosed embodiments, to provide an interface to access historical process data. The process data is produced by data sources 102 at the shop floor, which may include a number of field devices, controllers, and other IoT devices. The process data may include, for example, digital and/or analog input and output data of such devices. The process data may be ingested into data stores 302 that are local to some of the data sources 102. The UDM 106 retains such data stores 302 in the persistent storage layer 202 without any duplication of the process data. The UDM 106 may provide pre-built data stores 304 as part of the persistent storage layer 202 in the process historian 300 for data sources 102 without local storage.

According to disclosed embodiments, the process historian software 300 including the UDM 106 is modularized and configurable to different scales of implementation at different levels of automation, such as at a machine level (e.g., on a PLC or other controller), at an edge computing level (e.g., on an industrial PC), at an enterprise level (e.g., on a SCADA system), or at a cloud level. For instance, to build a specialized, low footprint, embedded historian on a constrained device (low computation power and memory) that only acquires data from one type of sensor and forwards the data to an external server, the following base libraries may be selected: a single connector API module in the ingestion API layer (e.g., Modbus), a single data store (e.g. file based), a simple database management system (e.g., time series DB) in the specialized data management layer and a REST API support (e.g. Web) in the unified query API layer. In another use case, a full-fledged, enterprise level process historian may be configured by including more base libraries in the various layers which provide more functionalities (e.g. timeseries DB, graph DB, distributed object store, . . . ), more interfaces to acquire data at the ingestion API layer (e.g. OPC UA, Modbus, MQTT, etc.) and unified query API layer to provide access to various types of applications (e.g. web apps, C++ native apps, SQL clients, etc.).

In embodiments, a historian/UDM configurator may be provided to configure the base libraries to be included at various layers of the UDM. The input to the configurator can include, for example, a configuration specification in a suitable format, such as an XML configuration file, which can list the libraries to be included in each of the UDM layers. In some embodiments, a low-code platform may be provided to program the interactions of the base libraries within the UDM layers, where a user can program a workflow by linking between the base libraries. The historian/UDM may thus be configured in a low-code platform to run at different levels of automation, for example as a library module in an application on an embedded device (e.g., a controller or an HMI device), as a containerized app on an edge computing device or in a virtual device hosted by a data central server, as a cloud-based software-as-a-service (SaaS) or platform-as-a-service (PaaS) hosted in a public cloud (e.g., Google™ Cloud, Azure™, etc.), among others.

Figure 4:
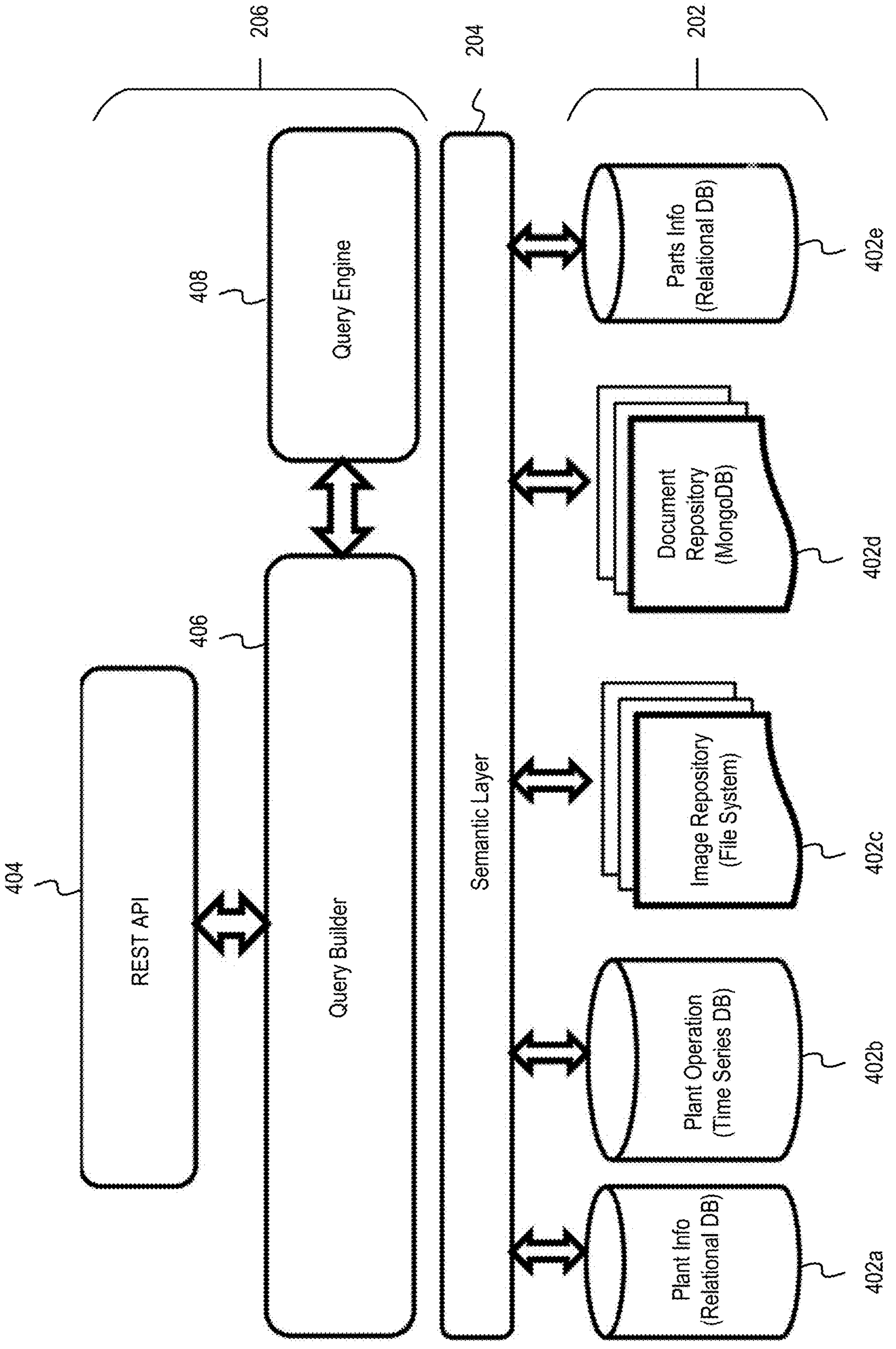
FIG. 4 illustrates an example of query execution using a UDM module according to disclosed embodiments.

FIG. 4 illustrates an example of query execution using a UDM according to the disclosed methodology. In this example, the persistent storage layer 202 includes the following data stores, namely: a plant information data store 402*a* (relational database), a plant operation datastore 402*b* (time series database), an image repository 402*c* (file system), a document repository 402*d* (document database such as MongoDB) and a parts information datastore 402*e* (relational database). The unified query API layer 206 includes a REST API interface 404 that can receive a query request structured in a unified syntax for all data stores. An example of a query request based on JavaScript Object Notation (JSON) is presented below:

Example of Query Request

```
{         "plantID 0001",
          "queryID": 1,
          "query": [
            {
              "context": "PARTS",
              "criteria": "PART_HISTORY < 10 YEAR"
            },
            {
              "context": "TEMERATURE",
              "criteria": "LAST 1 DAY"
            }
          ]
}
```

The query request may be executed via the unified query API layer 206 as follows. First, a query builder 406 extracts query parameters from the REST API interface 404. As per the example format, the query parameters include a "context" and a "criteria". In this example, the context is established simply by a data type such as "Parts" or "Temperature". In some embodiments, more than one data store may have the same data type, in which case, the context may be established, for example, using a data store identifier in addition to the datatype (e.g., "Temperature 01") or in place of the data type.

The query builder 406 consults the semantic layer 204 for building one or more dedicated queries based on the context information derived from the query parameters. For example, the query builder 406 may look up the service registry of the data stores in the semantic layer 204 to map the queries to individual data stores based on data type (context). In this case, the dedicated queries are mapped to the data stores 402*e* and 402*b* based on the context "Parts" and "Temperature" respectively. Having identified the data stores, the dedicated queries may be built based on the "criteria" derived from the query parameters and using the information in the data store service registry, such as address, access API and data schema.

After the dedicated queries are built by the query builder 406, a query engine 408 executes these queries on the respective data stores 402*e* and 402*b*. The data aggregated from the data stores 402*e* and 402*b* are consolidated and returned as a query result by the REST API interface. An example of a query result as a JSON message is presented below:

Example of Query Result

```
{
  "plantID": "0001",
  "queryID": 1,
```

-continued

Example of Query Result

```
  "result": [
    {
      "TEMERATURE": [
        {
          time: 12334456,
          value: 50
        },
        {
          time: 12334460,
          value: 55
        },
        {
          time: 12334480,
          value: 60
        },
        ...
      ]
    }
    {
      "PARTS": [
        {
          "ID": "001",
          "PART_ID": "0000000034343",
          "PART_DESCRIPTION":
          "REMAIN_LIFE": 20000
        },
        {
          "ID": "002",
          "PART_ID": "0000000034344",
          "PART_DESCRIPTION":
          "REMAIN_LIFE": 10000
        },
        ...
      ]
    }
  ]
}
```

Aspects of the disclosed methodology may be implemented by a data processing system. Such a data processing system may include one or more processors and non-transitory memory storing a software stack comprising computational modules executable by the one or more processors, wherein the software stack includes a UDM according one or more of the disclosed embodiments. The processing capability of the data processing system may be distributed among multiple system components, such as among multiple processors and memories, optionally including multiple distributed processing systems or cloud/network elements.

Figure 5:
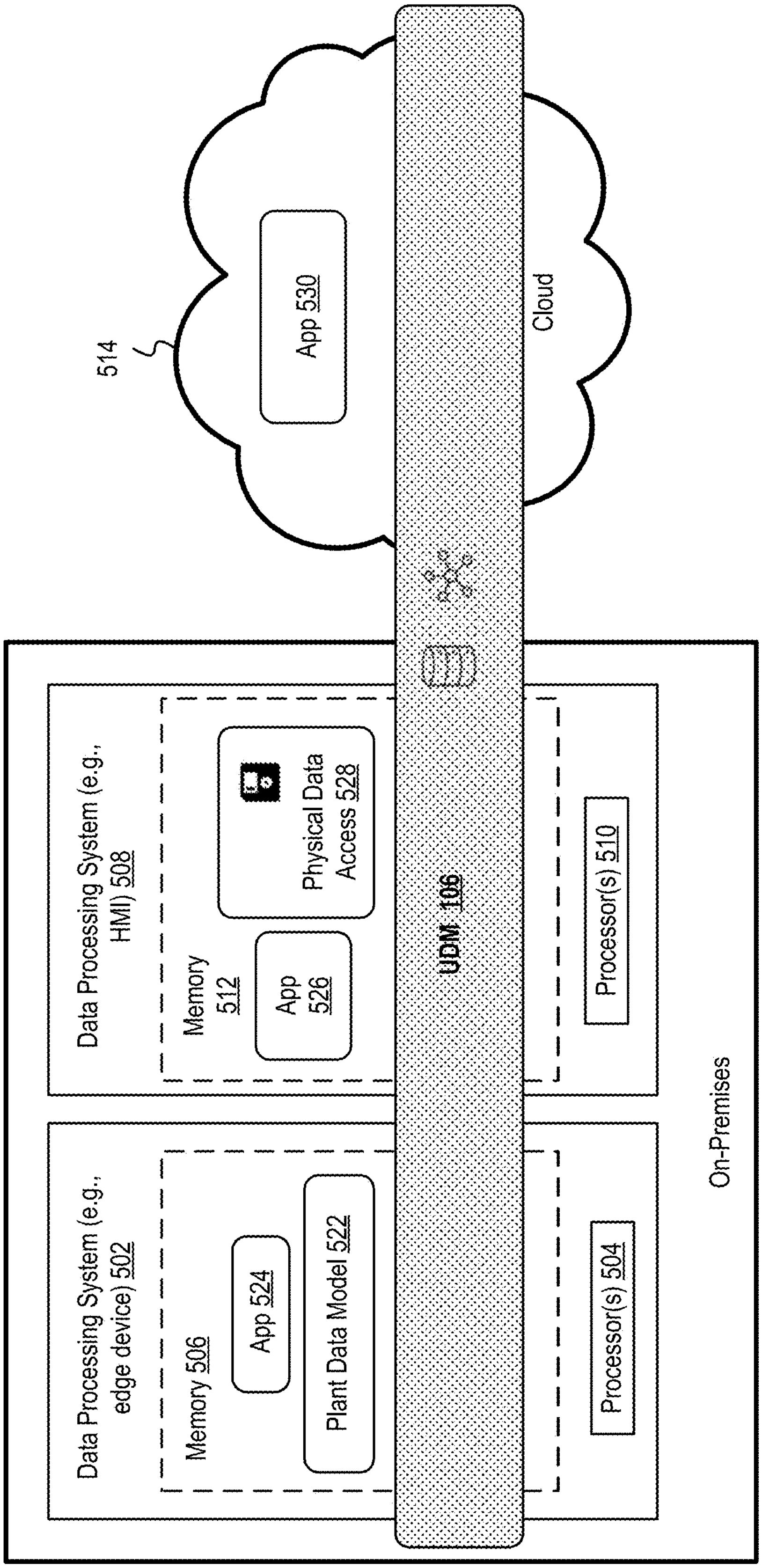
FIG. 5 is a schematic diagram illustrating integration of a UDM module into a number of on-premises and cloud-based data processing systems.

FIG. 5 is a schematic diagram illustrating integration of a UDM into a number of on-premises and cloud-based data processing systems. An automation system can include different types of data processing systems at various levels of automation (e.g., machine level, edge computing level, enterprise level and cloud level), with each running their own versions of the UDM, which may be configured based on specific requirements of the individual data processing systems. As shown, a first on-premises data processing system 502, such as an edge computing device, may include one or more processors 504 and a local memory 506 storing a software stack that includes a plant data model 522 on top of a UDM 106, and one or more apps 524, where an app 524 may query the UDM 106 via the plant data model 522 based on a standard, such as OPC UA. The UDM 106 exposes the unified query API to the plant data model 522 to access data from the persistent storage layer. A second on-premises data processing system 508, such as a human machine interface (HMI) device, may include one or more processors 510 and a local memory 512 storing a software stack that includes one or more apps 526 on top of a UDM 106, where the UDM 106 may allow direct access to an app 528 to query data from the persistent storage layer. The UDM 106 may also allow a user interacting with the data processing system 508 to retrieve data from the persistent storage layer via a physical data access 528. A third data processing system 514 may be implemented in a cloud computing environment where data is synched to a cloud version of the UDM 106 providing direct access to data by cloud-based apps 530, which can provide a virtually unlimited and highly scalable solution.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the appended claims.

What is claimed is:

1. A data processing system for an automation system, comprising:
- one or more processors, and
- non-transitory memory storing a software stack comprising computational modules executable by the one or more processors, the software stack including a unified data management module configured to:
  - receive a query request via a unified query API layer configured to expose a common interface for accessing data from a persistent storage layer including a plurality of data stores that ingest data respectively from a plurality of data sources in the automation system, wherein the plurality of data stores include different access APIs and data schema,
  - extract query parameters from the unified query API layer and use the extracted query parameters to build a dedicated query structured for a specific data store by a query builder utilizing a semantic layer, wherein the semantic layer is configured to map queries to individual data stores based on context information derived from query parameters and provide access to individual data stores based on their respective access API and data schema, and
  - execute the dedicated query directly on the specific data store by a query engine and return a query result via the unified query API layer,
  - wherein, based on the context information, the semantic layer is utilized by the query builder to build multiple dedicated queries from the query request, each dedicated query structured respectively for a specific data store, and
  - wherein the multiple dedicated queries are executed directly on the specific data stores by the query engine and data aggregated therefrom is returned in the form of a consolidated query result via the unified query API layer.

2. The data processing system according to claim 1, wherein the unified query API layer comprises a first one or more APIs for providing programmatic access to data from the persistent storage layer by an application or a plant data model on top of the unified data management module in the software stack.

3. The data processing system according to claim 1, wherein the unified query API layer comprises a second one or more APIs for providing physical data access from the persistent storage layer by a user interacting with the data processing system for retrieving data from the persistent storage layer.

4. The data processing system according to claim 1, wherein the persistent storage layer is realized, at least in part, by data stores local to the respective data sources.

5. The data processing system according to claim 4, wherein the unified data management module provides one or more pre-built data stores as part of the persistent storage layer for ingesting data from one or more data sources without local storage, the one or more pre-built data stores configured based on a data type associated with the one or more data sources.

6. The data processing system according to claim 1, wherein the context information includes a data store identifier and/or a data type specified in the query parameters.

7. The data processing system according to claim 1, wherein the semantic layer comprises, for each of the data stores in the persistent storage layer, a registry containing an address, data type, assess API and data schema.

8. The data processing system according to claim 1, wherein the semantic layer is further configured to dynamically detect a status of existing and new data stores added to the persistent storage layer.

9. The data processing system according to claim 1, comprising a process historian software that includes the unified data management module for providing an interface to access historical process data of the automation system,
- wherein the data sources include field devices and/or controllers of the automation system, and
- wherein the process data produced by the data sources include digital and/or analog input and output data.

10. The data processing system according to claim 1, wherein the unified data management module is modularized and configured by selecting base libraries at different layers of the unified data management system using a configurator based on a level of automation that the data processing system operates on, the level of automation selected from the group consisting of: machine level, edge computing level, enterprise level and cloud level.

11. The data processing system according to claim 10, wherein the configurator provides a low-code platform to program a workflow by a user by defining interactions between the selected base libraries in the unified data management module layers.

12. A method for providing unified access to data generated in an automation system, comprising:

receiving a query request via a unified query API layer configured to expose a common interface for accessing data from a persistent storage layer including a plurality of data stores that ingest data respectively from a plurality of data sources in the automation system, wherein the plurality of data stores include different access APIs and data schema, extracting query parameters from the unified query API layer and using the extracted query parameters to build a dedicated query structured for a specific data store by a query builder utilizing a semantic layer, wherein the semantic layer is configured to map queries to individual data stores based on context information derived from query parameters and provide access to individual data stores based on their respective access API and data schema, and executing the dedicated query directly on the specific data store by a query engine and returning a query result via the unified query API layer, wherein, based on the context information, the semantic layer is utilized by the query builder to build multiple dedicated queries from the query request, each dedicated query structured respectively for a specific data store, and wherein the multiple dedicated queries are executed directly on the specific data stores by the query engine and data aggregated therefrom is returned in the form of a consolidated query result via the unified query API layer.

13. A non-transitory computer-readable storage medium encoded with instructions that, when processed by a data processing system, configure the data processing system to perform the method according to claim 12.

14. A data processing system for an automation system, comprising:

one or more processors, and non-transitory memory storing a software stack comprising computational modules executable by the one or more processors, the software stack including a unified data management module configured to:

receive a query request via a unified query API layer configured to expose a common interface for accessing data from a persistent storage layer including a plurality of data stores that ingest data respectively from a plurality of data sources in the automation system, wherein the plurality of data stores include different access APIs and data schema, extract query parameters from the unified query API layer and use the extracted query parameters to build a dedicated query structured for a specific data store by a query builder utilizing a semantic layer, wherein the semantic layer is configured to map queries to individual data stores based on context information derived from query parameters and provide access to individual data stores based on their respective access API and data schema, and execute the dedicated query directly on the specific data store by a query engine and return a query result via the unified query API layer, wherein the unified data management module is modularized and configured by selecting base libraries at different layers of the unified data management system using a configurator based on a level of automation that the data processing system operates on, the level of automation selected from the group consisting of: machine level, edge computing level, enterprise level and cloud level.

* * * * *